United States Patent [19]
Overcash et al.

[11] Patent Number: 5,794,307
[45] Date of Patent: Aug. 18, 1998

[54] WHEELBARROW HANDLE EXTENSION

[76] Inventors: Rufus B. Overcash; Louisa C. Overcash, both of 6711 Pine Lake Ln., Charlotte, N.C. 28227

[21] Appl. No.: 743,497

[22] Filed: Nov. 4, 1996

[51] Int. Cl.⁶ .................................................. A47B 95/02
[52] U.S. Cl. ..................... 16/114 R; 280/47.31; 294/58
[58] Field of Search ................... 16/114 R, 110 R, 16/111 R, DIG. 40, DIG. 41; 294/58; 280/47.2, 47.3, 47.31, 47.315

[56] References Cited

U.S. PATENT DOCUMENTS

| | | | |
|---|---|---|---|
| 1,516,856 | 11/1924 | Johnson | 280/47.31 |
| 1,829,467 | 10/1931 | Atkinson | 16/114 R |
| 2,244,585 | 6/1941 | Tweit | 16/114 R |
| 2,547,451 | 4/1951 | Eber | 294/58 |
| 2,983,520 | 5/1961 | Klages | 280/47.315 |
| 3,173,705 | 3/1965 | Dupuy | 280/47.31 |
| 3,977,477 | 8/1976 | Wise | 280/47.31 |
| 4,911,575 | 3/1990 | Tidwell | 294/58 |
| 4,958,407 | 9/1990 | Johnson | 294/58 |
| 5,048,883 | 9/1991 | Waluk | 294/58 |
| 5,060,343 | 10/1991 | Nisenbaum | 294/58 |
| 5,153,966 | 10/1992 | Godwin | 280/47.31 |

*Primary Examiner*—Chuck Mah
*Attorney, Agent, or Firm*—Dorothy S. Morse

[57] ABSTRACT

A back saving handle extension for attachment to the straight, shaft-like type of handle typically found on a wheelbarrow which allows a person of taller than average stature to effectively use the wheelbarrow, or similar device, without having to bend over excessively to do so. It is contemplated for a pair of extensions to be employed for most effective use of a device having two handles, with one extension being connected to each handle. Each extension comprises a arcuate tubular member having a flexible hand grip attached to its distal end and connection means securely attaching its other end to the distal end of a straight wheelbarrow-type of handle. For use of a wheelbarrow by only people of taller than average stature, extension may be positioned in a vertical orientation with its hand grip substantially above its arcuate member. For alternative use of a wheelbarrow by shorter people and people of taller than average stature, without the need to remove the extensions between such alternative use, extensions may be positioned in an orientation sufficiently laterally displaced from vertical wherein the shorter people can still reach and use the straight, shaft-like handles without interference from while the extension hand grips. Applications may include, but are not limited to, use with wheelbarrows, garden carts, and other apparatus having handles.

11 Claims, 3 Drawing Sheets

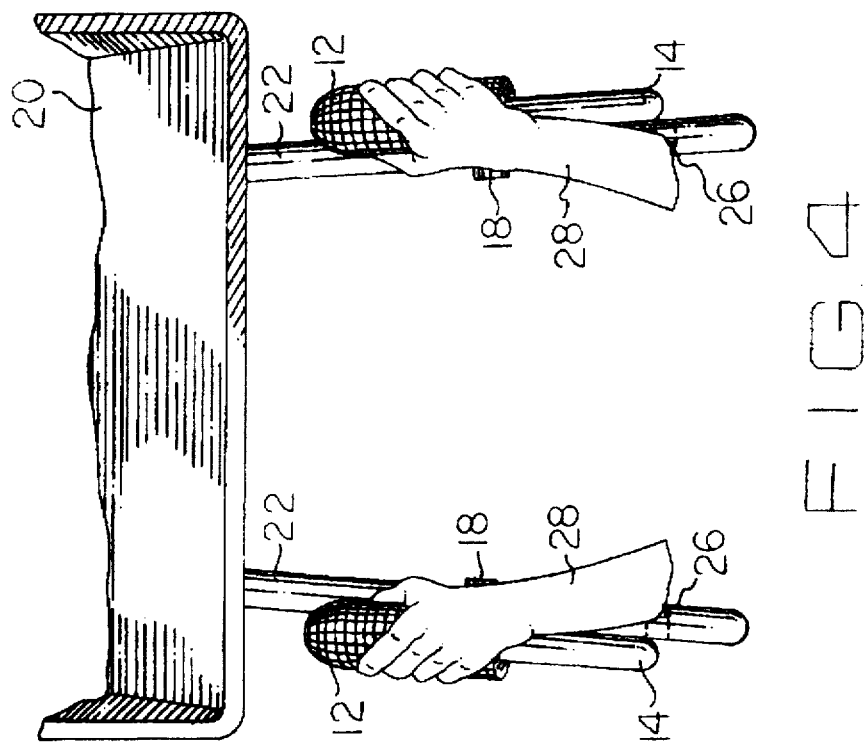
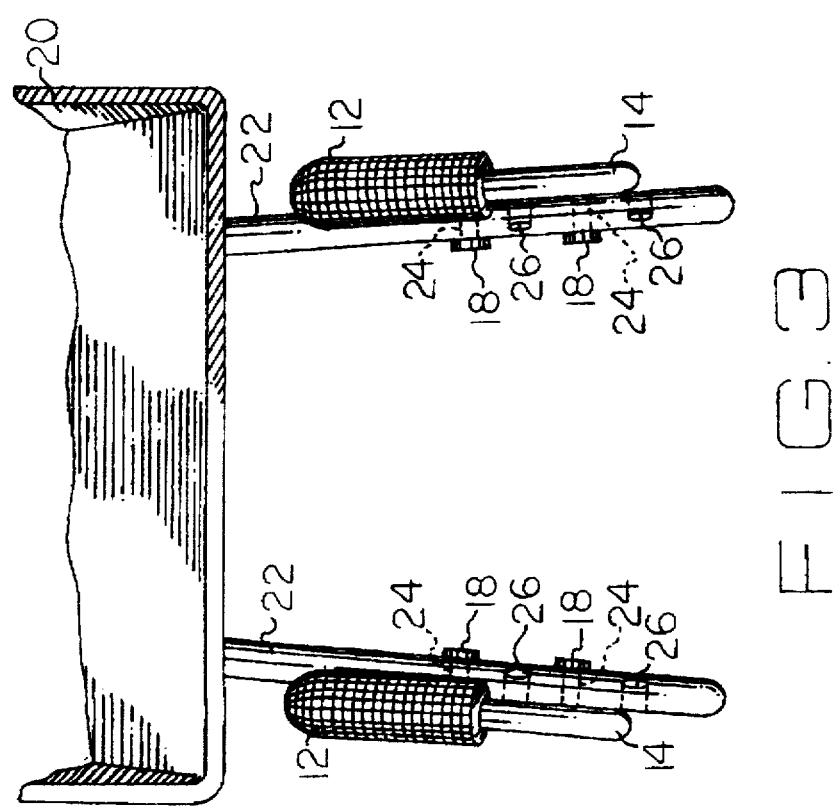

WHEELBARROW HANDLE EXTENSION

BACKGROUND - FIELD OF INVENTION

This invention relates to handle extensions, specifically to a handle extension for attachment to a straight, shaft-like handle, such as that typically used on a wheelbarrow, which would allow a person of taller than average stature to effectively use the wheelbarrow without having to bend over excessively to do so and which is contemplated to be attached to the shaft-like handle in an orientation sufficiently laterally displaced from vertical so that taller than average people and average-sized or short people can both conveniently use the wheelbarrow without removal of the extension. Applications may include, but are not limited to, use with wheelbarrows, garden carts, and other devices having straight, shaft-like handles.

BACKGROUND - DESCRIPTION OF PRIOR ART

Wheelbarrows typically are standardized in configuration and dimension for use by persons of average stature. Ideally an operator of a wheelbarrow having a load should be able to pickup up the handles the wheelbarrow with only a slight bend in the knees so that undue strain is not placed on the operator's back or knees. People having a taller than average stature are many times disadvantaged in the use of wheelbarrows, and similar devices having straight, shaft-like handles, in that typically they must bend over to reach and firmly grasp their handles during use. When a wheelbarrow is heavily loaded, tall people required to use the original wheelbarrow handles made for comfortable use by shorter people can easily injure their back, the amount of the injury depending upon the extent which they are required to bend over and the whether they must move the wheelbarrow over a straight or inclined surface. It therefore would be useful, and it is not known, to have simply constructed easy-to install, arcuate handle extensions for wheelbarrows, and similar devices having straight, shaft-like handles, to allow tall people to effectively use the devices without having to bend over excessively and subject their backs to possible injury and which also allows the wheelbarrow or other device to be easily stored off the ground by hanging the arcuate extensions over a wall or a fence.

SUMMARY OF INVENTION - OBJECTS AND ADVANTAGES

It is the primary object of this invention to provide a back saving device for people of taller than average stature to allow them to effectively use a wheelbarrow, or similar device with straight, shaft-like handles, without having to bend over excessively to do so. It is also an object of this invention to provide extensions for straight, shaft-like handles, such as the handles on a wheelbarrow which are easily attached to and removed therefrom. A further object of this invention is to provide wheelbarrow handle extensions which can be securely attached to the wheelbarrow handles during use. It is also an object of this invention to provide wheelbarrow handle extensions which can be positioned both in a vertical orientation with its hand grip substantially over its proximal end or in an orientation sufficiently laterally displaced from a vertical wherein the shorter people can still reach and use the handles of the wheelbarrow without interference from the extension hand grips. A further object of this invention is to provide wheelbarrow handle extensions which can be securely gripped by a user for safe, comfortable, and effective use on both flat and inclined surfaces. It is also an object of this invention to provide wheelbarrow handle extensions configured for use in suspended storage of a wheelbarrow, or similar device with straight, shaft-like handle such as that, from a wall or fence.

As described herein, properly manufactured, and attached to a straight, shaft-like handle such as that commonly used on a wheelbarrow, the present invention would provide an upwardly extending hand grip that would allow a person of taller than average stature to effectively use the wheelbarrow, without having to bend over excessively so as to subject his or her back to a risk of injury. The present invention could be attached to the upper surface of each wheelbarrow handle by connection means in the form of hose clamps, which provide a secure connection during use yet allow easy removal of the extension after use, if removal is required. In the alternative connection of the extension can be made by bolts inserted through holes drilled through both the wheelbarrow handle and the extension. Several holes are contemplated in the wheelbarrow handle, at least one hole being horizontally positioned so that the extension can be placed in a vertical orientation with its hand grip above its proximal end, and other holes being obliquely angled relative to the horizontal holes to provide means for extension orientation so that the hand grips are sufficiently laterally displaced from a vertical position relative to its proximal end to allow more convenient use by tall people of differing heights, as well as dual use by tall and shorter people without removal of the extension. The hand grip on the distal end of each handle extension of the present invention is provided with a flexible gripping surface configured and dimensioned for non-slip gripping by adult human hands. The arcuate portion of the present invention also provides an easily held surface for use in guiding the device to which it is attached forwardly down an inclined surface that is more easily retained within the grip of an operator than the straight shaft-like handles typically used on wheelbarrows. When clamps are used to attach the present invention to straight, shaft-like wheelbarrow handles, each extension can be positioned with its hand grip above its proximal end, or positioned with its hand grip sufficiently laterally displaced from vertical at a variety of angles for dual use of the wheelbarrow, by both tall people, and people of average stature without removal of the extension from the wheelbarrow handle. In the alternative when bolts are used to attach the present invention to the wheelbarrow handle, it is contemplated for a pair of holes to be drilled through proximal end of the arcuate member of the present invention, and for bolts and nuts to be inserted directly through holes in both the extension and the wheelbarrow handle. Therefore, to change the orientation of the extension, instead of loosening a clamp and applying a force to the clamp to readjust its position, with the use of nuts and bolts directly inserted through holes in the extension and the wheelbarrow handle, the bolts must be withdrawn from the wheelbarrow handle and reinserted through a hole through the wheelbarrow handle that is oriented at a different angle relative to the former hole used. The arcuate configuration of the extensions also allows an operator to conveniently store an attached wheelbarrow, or apparatus, in a suspended manner over a flat surface, such as a wall or a fence The description herein provides preferred embodiments of the present invention but should not be construed as limiting the scope of the wheelbarrow handle extension invention. For example, variations in type of material used for making the handle grips, the surface configuration of the handle grips, the number of connectors or clamps used to connect each extension to a wheelbarrow handle, the type of attachment means used to connect each extension to a wheelbarrow handle, the radius of curvature of the arcuate portion of each extension, and the material from which each arcuate member is made, other than those shown and described herein, may be incorporated into the present invention. Thus the scope of the present invention should be determined by the appended claims and their legal equivalents, rather than the examples given.

BRIEF DESCRIPTION OF THE DRAWINGS

FIG. 3 is a top view of the invention bolted to straight, shaft-like wheelbarrow handles so that the extension hand grips are positioned substantially over their proximal ends.

FIG. 4 is a top view of the invention having the hands of a tall operator holding onto the hand grips.

DETAILED DESCRIPTION OF PREFERRED EMBODIMENTS

Figure 1:
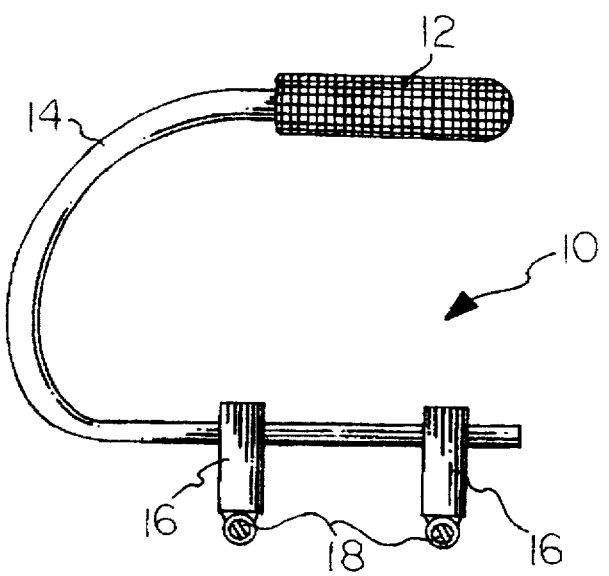
FIG. 1 is a side view of the invention.

FIG. 1 shows a preferred embodiment of handle extension 10 comprising an arcuate member 14 having a distal end and a proximal end, two clamping members 16 each with a clamp securing means 18 attached thereto, each clamping means 16 being positioned so as to engage the proximal end of tubular member 14, and a hand grip 12 which is attached to the distal end of tubular member 14. It is contemplated for two tubular members 14 to be typically used with having straight, shaft-like handles apparatus, such as the wheelbarrow shown in FIG. 2 as number 20, wherein one tubular member 14 is connected to each handle thereof. In the preferred embodiment it is contemplated for hand grips 12 to be made from a flexible material, such as a rubber or rubber-like compound, and to be configured for easy gripping by an adult human hand shown in FIGS. 4 and 6 as number 28. The material from which hand grips 12 are made must also be sufficiently durable to withstand repeated grip adjustment by operators managing heavy loads. Also, in the preferred embodiment, although not critical, it is contemplated for tubular member 14 to be made from a lightweight material, such as aluminum. The number of clamping members 16 used is not critical to handle extension 10 as long as a sufficient number of clamping members 16 are used to provide secure attachment of tubular member 14 to the handle of wheelbarrow 20 during use. Also, the type of clamping means 16 and clamp securing means 18 used are not critical to the present invention. Although in the preferred embodiment it is contemplated for clamping members 16 to each comprise a conventional hose clamp and for clamp securing means 18 to comprise a bolt and a nut threaded for connection to the bolt, other means of attaching tubular members 14 to the handles of wheelbarrow 20 are also contemplated such as the direct connection of bolts through holes drilled through both the proximal end of tubular member 14 and the handle of wheel barrow 20.

Further, although the dimensions of handle extensions 10 are not critical to the present invention, in the preferred embodiment tubular member 14 has an outside diameter of approximately one inch, hand grips 12 are approximately four-and-one-half inches in length, the dimension between the distal end of tubular member 14 and its proximal end is approximately six inches, and the dimension from a hypothetical line formed between the distal end and the proximal end of each tubular member 14 and the outermost curved surface of the arcuate portion tubular member 14 is approximately nine inches.

Figure 2:
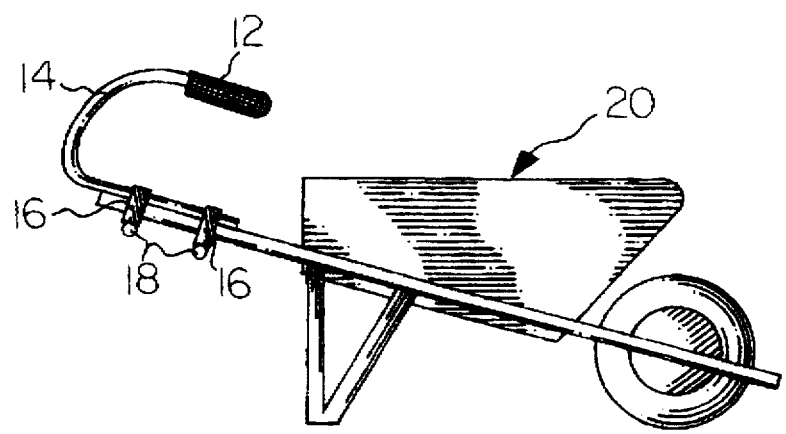
FIG. 2 is a side view of the invention attached to the handles of a wheelbarrow.

FIG. 2 shows the proximal end of tubular member 14 attached against the upper surface of a handle of wheelbarrow 20 by two clamping members 16. FIG. 2 also shows hand grip 12 attached to the distal end of tubular member 14 and one securing means 18 connected to each clamping member 16. In the preferred embodiment clamping members 16 comprise conventional hose clamps which allow tubular members 14 to be easily positioned sufficiently lateral to vertical for dual use of wheelbarrow 20 by both persons of average stature (not shown) and persons of taller than average stature (not shown) without removal of tubular members 14 from the handle of wheelbarrow 20. However, it is also contemplated for tubular members 14 to be attached to the handles of wheelbarrow 20 by other means, such as through the use of bolts (not shown) inserted through one of several pairs of holes drilled through the handles of wheelbarrow 20 and a pair of holes drilled through tubular member 14, and the use of nuts (not shown) to secure the bolts in position. Multiple holes in each handle of wheelbarrow 20 would allow handle extensions 10 to be placed in both a vertical orientation and at least one orientation sufficiently laterally displaced from vertical for use of wheelbarrow 20 by a person of average stature (not shown) without removal of tubular member 14. It is also preferred that the means used to secure tubular members 14 to the handles of wheelbarrow 20 permit tubular members 14 to be easily removed from the handles of wheelbarrow 20 as needed.

FIGS. 3 and 4 show one tubular member 14 attached to each handle 22 of wheelbarrow 20. For clarity of illustration tubular members 14 are attached to the outside surface of each handle 22. During use, it is contemplated for tubular members 14 to be attached to either the outside surfaces of handles 22, or to be attached to the top surface of each handle 22, however, in the preferred embodiment it is contemplated for tubular members 14 to each be attached to the top surface of one handle 22. For further illustration, a pair of horizontal holes 24 are shown in FIGS. 3 and 4 through both handles 22 and the proximal end of each tubular member 14, with a separate pair of obliquely angled holes 26 shown through each handle 22. Although not shown, during actual use handles 22 may have only one pair of holes therethrough and tubular members 14 may have vertical holes instead of horizontal holes 24 for connection to handles 22. For example, should only a tall operator (not shown) use wheel barrow 20, tubular members 14 may be connected to the top surfaces of handles 22 through the use of vertical holes (not shown) in each. If both a tall operator and a shorter operator need to use wheelbarrow 20, one pair of obliquely angled holes 26 could be used through both tubular members 14 and handles 22. Also, as shown in FIGS. 3 and 4, both horizontal holes 24 and obliquely angled holes 26 could be made through each handle 22 for alternative connection of tubular members 14 in different orientations. In FIGS. 3 and 4, securing means 18 are shown positioned through horizontal holes 24. FIG. 4 also shows the hands 28 of a tall operator (not shown) holding hand grips 12 on the distal ends of each tubular member 14. Although the number of horizontal holes 24 and obliquely angled holes 26 is not critical, a sufficient number should be used to make tubular members 14 securely attached to handles 22 during use.

Figure 5:
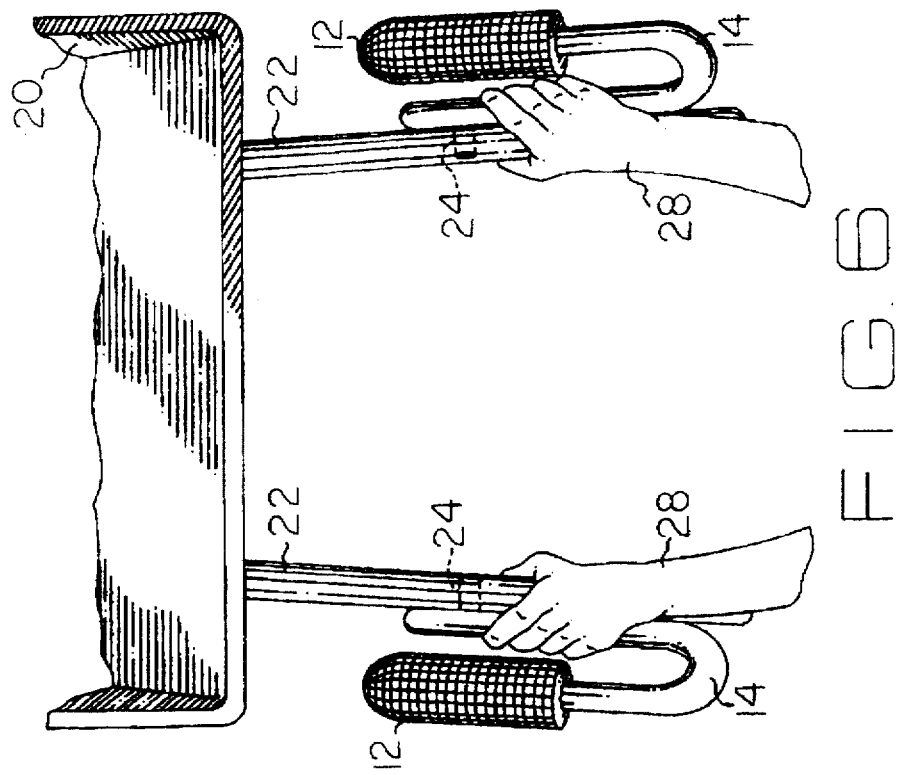
FIG. 5 is a top view of the invention bolted to straight, shaft-like wheelbarrow handles so that the extension hand grips are laterally displaced from vertical.
Figure 6:
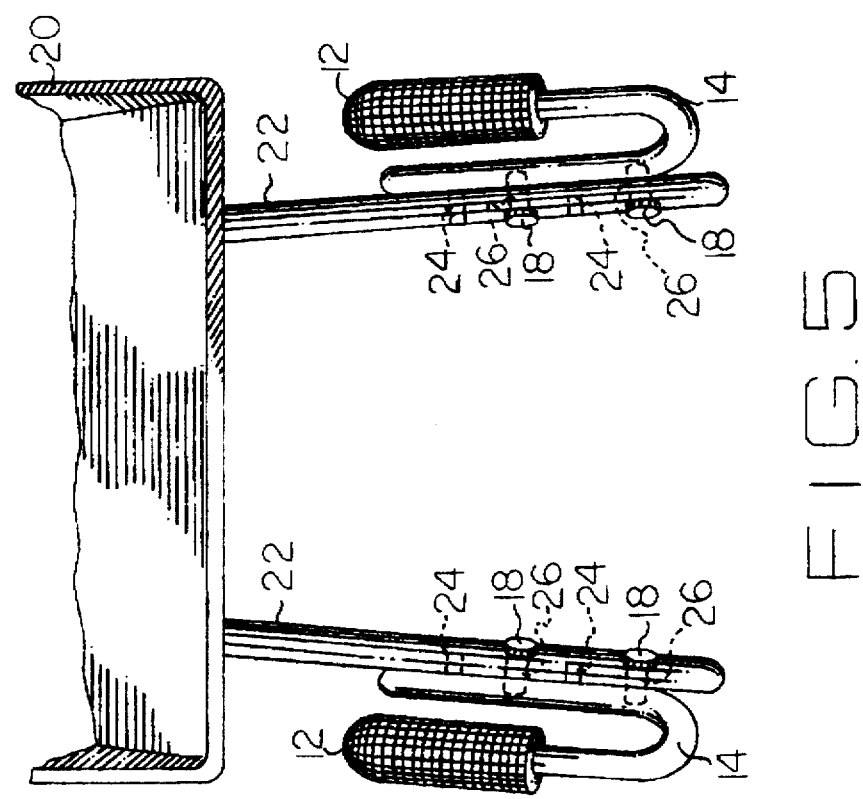
FIG. 6 is a top view of the invention having the hands of a short operator holding onto the wheelbarrow handles while the extensions remain attached to the wheelbarrow handles in a position where the two hand grips do not interfere with the short operator's effective use of the wheelbarrow.

FIGS. 5 and 6 show one tubular member 14 attached to each handle 22 of wheelbarrow 20 with securing means 18 connecting each tubular member 14 to one handle 22 through obliquely angled holes 26. Horizontal holes 24 through handles 22 are shown unused. In the preferred embodiment shown in FIGS. 5 and 6 it is contemplated for each securing means 18 to comprise a bolt and a threaded nut. FIG. 6 also shows the hands 28 of a short operator (not shown) holding handles 22 without interference from hands grips 12 which are sufficiently laterally displaced from vertical to be in an out-of-the-way position during use by the short operator. It is contemplated for the proximal end of tubular member 14 to be sufficiently tapered or otherwise reduced in diameter so that it wraps around handle 22 and its connection to handle 22 does not make the grip of the combined handle 22 and proximal end cumbersome for the operator.

In using the present invention to allow a person of taller than average stature (not shown) to effectively use wheelbarrow 20 with only a slight bend in the knees during such use, one must provide two handle extensions 10 and attach one handle extension 10 to each handle of wheelbarrow 20. The arcuate portion of each handle extension 10 would be positioned remotely from the front wheel of wheel barrow 20 to allow suspended storage of wheelbarrow 20 from a flat surface such as a wall or a fence (not shown), in addition to providing a user (not shown) with an arcuate surface to grasp for better control of wheelbarrow 20 when it is moving forwardly down an incline while under a load (not shown). Clamping members 16 may comprise conventional hose clamps which surround both tubular member 14 and the handle of wheelbarrow 20 and permit the proximal end of tubular member 14 to be placed upon the upper surface of handle 22, or bolts which are each secured by a nut and inserted through a pair of holes drilled through the proximal end of tubular member 14 and one of several pairs of holes drilled through each handle of wheelbarrow 20. When clamping members 16 are used, tubular members 14 may be easily oriented with its hand grips 12 sufficiently laterally displaced from vertical so as to allow dual use of wheelbarrow 20 by persons of average stature and persons of taller than average stature without removal of tubular member 14. More than one pair of holes drilled through each handle of wheelbarrow 20, and through the proximal end of tubular member 14 would also permit orientation of handle extensions 10 in positions with its hand grips 12 sufficiently laterally displaced from vertical for use of wheelbarrow 20 by a person of average stature without removal of tubular members 14. Flexible hand grips 12 positioned on the distal ends of tubular members 14 may be grasped by tall operators (not shown) for more comfortable and secure gripping tubular members 14 during use.

What is claimed is:

1. A handle extension for attachment to the straight, shaft-like type of handle commonly used on wheelbarrows and similar devices so that the extensions can be used by tall operators in combination with only a slight bend in their knees to lift and begin transport of a load in a wheelbarrow without having to excessively bend over and subject their backs to a risk of injury, said handle extension comprising an arcuate tubular member having a distal end and a tapered proximal end; a hand grip, said hand grip attached to said distal end, said hand grip being made from flexible material and having an outer surface conformable in configuration and dimension to an adult human hand of a taller than average operator; and said handle extension also comprising connection means, said connection means securely attaching said proximal end to the straight, shaft-like handle so that said distal end and said proximal end of said tubular member are positioned remote from an operator and so that a taller than average operator intending to move a device by one of its straight, shaft-like handles can instead do so by said hand grip with only a slight bend in the knees.

2. The handle extension of claim 1 wherein said connection means comprises a plurality of clamping members.

3. The handle extension of claim 2 wherein said clamping members are conventionally configured hose clamps.

4. The handle extension of claim 1 wherein said connection means comprises a plurality of bolts and a plurality of nuts each threaded for connection to at least one of said bolts to secure it in place, a plurality of pairs of holes drilled through the straight, shaft-like handle; said pairs of holes positioned to allow said hand grip to be oriented both vertically and sufficiently laterally displaced from vertical to allow use of the device by operators of average without interference from said hand grip; a pair of holes drilled through said proximal end; and said bolts being selectively inserted through each of said holes in said proximal end and one of said holes in said straight, shaft-like handle.

5. The handle extension of claim 1 wherein said tubular member comprises aluminum.

6. The handle extension of claim 1 wherein said tubular member has an outside diameter of approximately one inch and an arcuate portion with an outside curved surface, said hand grip is approximately four-and-one-half inches in length, said distal end is spaced apart from said proximal end approximately six inches, and the length of said tubular member from said the outside curved surface to said distal end is approximately nine inches.

7. A method for adapting a pair of straight, shaft-like wheelbarrow handles for more convenient use by an operator of taller than average stature by use of tubular arcuate extensions so that the attached wheelbarrow can be used by the tall operator without having to bend over excessively and risk back injury, as well as alternative use by operators having average stature without interference from said extensions if they remain attached, said method comprising the steps of providing two arcuate tubular members, two straight, shaft-like handles, and connection means; positioning the proximal end of one of said tubular members against one of said straight, shaft-like handles so that the proximal end of said tubular member is positioned remote to an operator; securing said proximal end of said tubular member to said straight, shaft-like handle with said connection means so that the distal end of said tubular member is positioned sufficiently laterally displaced from vertical so as to not cause interference for an operator of average size using said straight, shaft-like handles while said tubular member is attached; and repeating said positioning step and said securing step to attach the second of said tubular members to the second of the pair of straight, shaft-like wheelbarrow handles.

8. The method of claim 7 further comprising the steps of providing a pair of hand grips, and positioning one of said hand grips over each of said distal ends.

9. The method of claim 7 wherein said step of providing said connection means comprises the step of providing at least one clamping member.

10. The method of claim 9 wherein said step of providing said said clamping members comprises the step of providing at least one conventional hose clamp.

11. The method of claim 7 wherein said step of providing said connection means comprises the step of providing a plurality of bolts and a plurality of nuts each threaded for connection to at least one of said bolts, and further comprising the step of drilling a pair of holes through both of said wheelbarrow handles, and the step of drilling a pair of holes through said proximal ends of both of said tubular members, both of said drilling steps occurring prior to said securing step.

* * * * *